United States Patent
Guo et al.

(10) Patent No.: US 11,348,015 B2
(45) Date of Patent: May 31, 2022

(54) METHOD AND APPARATUS FOR ANALYZING INTENTION BASED ON ARTIFICIAL INTELLIGENCE

(71) Applicant: Beijing Baidu Netcom Science And Technology Co., Ltd., Beijing (CN)

(72) Inventors: Zhen Guo, Beijing (CN); Wenquan Wu, Beijing (CN); Zhanyi Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1083 days.

(21) Appl. No.: 15/642,871

(22) Filed: Jul. 6, 2017

(65) Prior Publication Data

US 2018/0121810 A1     May 3, 2018

(30) Foreign Application Priority Data

Oct. 31, 2016    (CN) .......................... 201610972070.2

(51) Int. Cl.
| | |
|---|---|
| *G06N 5/02* | (2006.01) |
| *G06N 3/00* | (2006.01) |
| *G06F 16/33* | (2019.01) |
| *G06F 40/30* | (2020.01) |
| *G06F 40/211* | (2020.01) |
| *G06F 40/284* | (2020.01) |

(52) U.S. Cl.
CPC .......... *G06N 5/022* (2013.01); *G06F 16/3331* (2019.01); *G06F 40/211* (2020.01); *G06F 40/284* (2020.01); *G06F 40/30* (2020.01); *G06N 3/004* (2013.01); *G06N 5/025* (2013.01)

(58) Field of Classification Search
CPC ........ G06F 17/27; G06F 17/30; G06F 17/271; G06F 17/277; G06F 17/278; G06N 3/00; G06N 3/004; G06N 5/02; G06N 5/022; G06N 5/025

See application file for complete search history.

(56) References Cited

U.S. PATENT DOCUMENTS

| | | | | |
|---|---|---|---|---|
| 6,766,320 | B1 * | 7/2004 | Wang .................... | G06F 16/313 |
| 10,332,508 | B1 * | 6/2019 | Hoffmeister ........... | G06N 7/005 |
| 10,388,274 | B1 * | 8/2019 | Hoffmeister ......... | G06N 3/0445 |
| 11,238,101 | B1 * | 2/2022 | Mohajer ............... | G06F 16/243 |

(Continued)

OTHER PUBLICATIONS

Lee, Geunbae, Mihwa Park, and Hyungsuk Won. "Using syntactic information in handling natural language queries for extended boolean retrieval model." Proceedings of the 4th international workshop on information retrieval with Asian languages (IRAL99). 1999: pp. 1-8 (Year: 1999).*

(Continued)

*Primary Examiner* — Kamran Afshar
*Assistant Examiner* — Randall K. Baldwin
(74) *Attorney, Agent, or Firm* — Lathrop GPM LLP

(57) ABSTRACT

The present disclosure provides a method and an apparatus for analyzing an intention based on artificial intelligence. The method includes: receiving a query; acquiring a keyword of an intention of the query according to a preset strategy; acquiring a qualifier of the intention of the query according to the keyword based on a syntax tree; and determining the intention of the query according to the keyword and the qualifier.

17 Claims, 6 Drawing Sheets

(56) References Cited

U.S. PATENT DOCUMENTS

| | | | | |
|---|---|---|---|---|
| 2010/0228693 | A1* | 9/2010 | Dawson | G06F 16/322 706/12 |
| 2012/0016678 | A1* | 1/2012 | Gruber | H04M 1/72547 704/275 |
| 2014/0365209 | A1* | 12/2014 | Evermann | G06F 40/35 704/9 |
| 2015/0293970 | A1* | 10/2015 | Li | G06F 16/248 707/722 |
| 2016/0019290 | A1* | 1/2016 | Ratnaparkhi | G06F 16/9024 707/743 |
| 2017/0011117 | A1* | 1/2017 | Jiang | G06F 40/253 |
| 2017/0017897 | A1* | 1/2017 | Bugay | G06F 40/18 |
| 2017/0099249 | A1* | 4/2017 | Kozareva | G06F 16/353 |
| 2017/0213157 | A1* | 7/2017 | Bugay | G06F 40/169 |
| 2017/0243107 | A1* | 8/2017 | Jolley | G06N 5/02 |
| 2018/0095967 | A1* | 4/2018 | Kota | G06F 16/334 |

OTHER PUBLICATIONS

Jiang, Mengxia, et al. "Interactive predicate suggestion for keyword search on RDF graphs." International Conference on Advanced Data Mining and Applications. Springer, Berlin, Heidelberg, 2011: 96-109 (Year: 2011).*

Park, Kinam, et al. "Automatic extraction of user's search intention from web search logs." Multimedia tools and applications 61.1 (2012): 145-162. (Year: 2012).*

Tsur, Gilad, et al. "Identifying web queries with question intent." Proceedings of the 25th International Conference on World Wide Web. Apr. 2016: 783-793 (Year: 2016).*

Dai, Honghua, et al. "Detecting online commercial intention (OCI)." Proceedings of the 15th international conference on World Wide Web. 2006: 829-837. (Year: 2006).*

Hu, Jian, et al. "Understanding user's query intent with Wikipedia." Proceedings of the 18th international conference on World wide web. 2009: 471-480. (Year: 2009).*

Cheung, Jackie Chi Kit, and Xiao Li. "Sequence clustering and labeling for unsupervised query intent discovery." Proceedings of the fifth ACM international conference on Web search and data mining. 2012. (Year: 2012).*

Chinese Patent Application No. 201610972070.2, Office Action dated Oct. 17, 2018, 14 pages.

Chinese Patent Application No. 201610972070.2, English translation of Office Action dated Oct. 17, 2018, 13 pages.

Tang, S., "Intelligent Answer System Based on Sentence Template"; Journal of Guangxi Normal University, Natural Science Edition, vol. 25, No. 2, Jun. 2007; pp. 5-8.

Zhang, X-L, "Research and Implementation of Question Analysis and Information Retrieval in Chinese Question Answering System", China Master's Theses Full-Text Database (Science and Technology Information), May 2007; 73 pages.

He, J. et al., "A Survey: Open-domain Question Answering System"; 6th China Conference on Information Retrieval (2010); pp. 114-121.

* cited by examiner

METHOD AND APPARATUS FOR ANALYZING INTENTION BASED ON ARTIFICIAL INTELLIGENCE

CROSS-REFERENCE TO RELATED APPLICATION

This application claims priority to and benefits of Chinese Patent Application Serial No. 201610972070.2, filed with the State Intellectual Property Office of P. R. China on Oct. 31, 2016, the entire content of which is incorporated herein by reference.

FIELD

The present disclosure relates to an internet technology field, and more particularly to a method and a device for analyzing an intention based on artificial intelligence.

BACKGROUND

Artificial intelligence (AI for short) is a new technology for studying and developing theories, methods, technologies and an application system for simulating and extending intelligence of humans. AI is a branch of computer technology, intending to know essence of intelligence and to produce an intelligent machine acting in a way similar to that of human intelligence. Research in the AI field include robots, speech recognition, image recognition, natural language processing and expert systems etc., in which natural language processing is a significant aspect of AI and has been widely applied in search engine technology.

With a rapid development of the internet, functions of a search engine have become more powerful. At present, the search engine may recognize an intention of a query input by a user so as to acquire the intention of the user, and then may acquire a search result desired by the user according to the intention.

However, a method for recognizing the intention in related art usually analyzing the intention by using simple templates and may only search in a specific field. Therefore, a recognition range of the method in related art is small, a recognition field is limited, the method is simple and a classification of the intention is less precise.

SUMMARY

Embodiments of the present disclosure seek to solve at least one of the problems existing in the related art to at least some extent.

For this, embodiments of a first aspect of the present disclosure provide a method for analyzing an intention based on artificial intelligence. The method includes: receiving a query; acquiring a keyword of an intention of the query according to a preset strategy; acquiring a qualifier of the intention of the query according to the keyword based on a syntax tree; and determining the intention of the query according to the keyword and the qualifier.

Embodiments of a second aspect of the present disclosure provide an apparatus for analyzing an intention based on artificial intelligence. The apparatus includes: a receiving module, configured to receive a query; a first acquiring module, configured to acquire a keyword of an intention of the query according to a preset strategy; a second acquiring module, configured to acquire a qualifier of the intention of the query according to the keyword based on a syntax tree; and a determining module, configured to determine the intention of the query according to the keyword and the qualifier.

Embodiments of a third aspect of the present disclosure provide a terminal, including: a processor; a memory for storing instructions executed by the processor, in which the processor is configured to:

receive a query;

acquire a keyword of an intention of the query according to a preset strategy;

acquire a qualifier of the intention of the query according to the keyword based on a syntax tree; and determine the intention of the query according to the keyword and the qualifier.

Embodiments of a fourth aspect of the present disclosure provide a non-transitory computer readable storage medium for storing one or more application programs, when executed by one or more processors in a mobile terminal, causing the mobile terminal to execute a method for analyzing the intention based on artificial intelligence. The method includes:

receiving a query;

acquiring a keyword of an intention of the query according to a preset strategy;

acquiring a qualifier of the intention of the query according to the keyword based on a syntax tree; and determining the intention of the query according to the keyword and the qualifier.

Embodiments of a fifth aspect of the present disclosure provide a computer program product, when the instructions in the computer program product are executed by a processor, executing the method for analyzing the intention based on artificial intelligence. The method includes:

receiving a query;

acquiring a keyword of an intention of the query according to a preset strategy;

acquiring a qualifier of the intention of the query according to the keyword based on a syntax tree; and determining the intention of the query according to the keyword and the qualifier.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
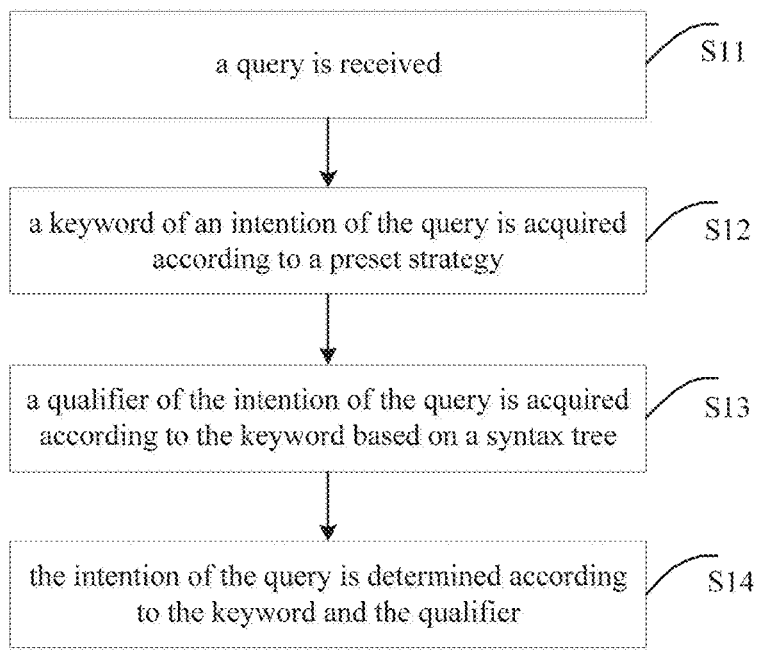
FIG. 1 is a flow chart of a method for analyzing an intention based on artificial intelligence according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure. Instead, the embodiments of the present disclosure comprise all the variants, modifications and their equivalents within the spirit and scope of the present disclosure as defined by the claims.

FIG. 1 is a flow chart of a method for analyzing an intention based on artificial intelligence according to an embodiment of the present disclosure. Embodiments of the present disclosure illustrate the method applied in a search engine. It should be noted that, the method is not limited to be used in search engines, and can be applied in other applications (such as intelligent question answer system etc.) for providing requirements service.

As shown in FIG. 1, the method includes the following acts.

In block S11, a query is received.

In this embodiment, information may be input in the search engine if a user desires to acquire information in some aspects. For example, when the user would like to know the weather in Beijing tomorrow, a query "how about the weather in Beijing tomorrow?" may be input in the search engine. The search engine receives the query, then performing a sentence analysis on the query.

In block S12, a keyword of an intention of the query is acquired according to a preset strategy.

An interrogative sentence is different from a declarative sentence in a sentence pattern and a sentence element. For example, a query using "what" or "how" intends to find a method or a solution; while a query using "how many" intends to find a number. Therefore, the intention of the query may be well-determined according to an interrogative in the query based on a syntactic analysis.

In this embodiment, the search engine acquires the keyword of the query using the preset strategy, which means that a meaning represented by the query is acquired. The preset strategy includes a template strategy, a rule strategy and a model strategy.

In this embodiment, the search engine may acquire the keyword of the intention via at least one of the following three ways.

In a first way, the keyword of the intention may be acquired using the template strategy.

In a second way, the keyword of the intention may be acquired using the rule strategy.

In a third way, the keyword of the intention may be acquired using the model strategy.

In block S13, a qualifier of the intention of the query is acquired according to the keyword based on a syntax tree.

In this embodiment, the qualifier of the intention of the query can be acquired according to the keyword of the intention based on the syntax tree after the keyword of the intention is acquired.

Figure 2:
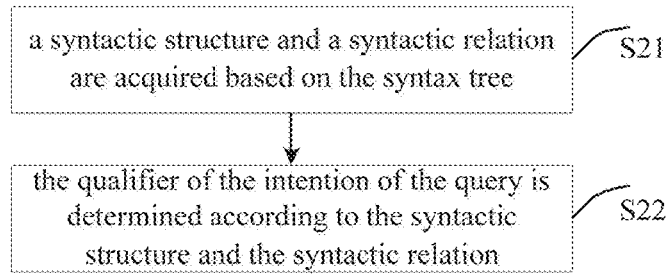
FIG. 2 is a flow chart illustrating acquiring a qualifier of the intention according to a syntax tree and a keyword of the intention.

In an embodiment of the present disclosure, as shown in FIG. 2, acquiring the qualifier of the intention of the query according to the keyword based on the syntax tree may include following acts.

In block S21, a syntactic structure and a syntactic relation are acquired based on the syntax tree.

In this embodiment, since the syntactic structure and the syntactic relation of each element of the query may be provided based on the syntax tree, a syntactic analysis may be performed on the query based on the syntax tree after the query is received, such that the syntactic structure and the syntactic relation are acquired.

In block S22, the qualifier of the intention of the query is determined according to the syntactic structure and the syntactic relation.

In this embodiment, after the syntactic structure and the syntactic relation are acquired, elements for modifying the keyword of the intention (i.e., the qualifier) may be acquired easily according to the keyword of the intention.

Figure 3:
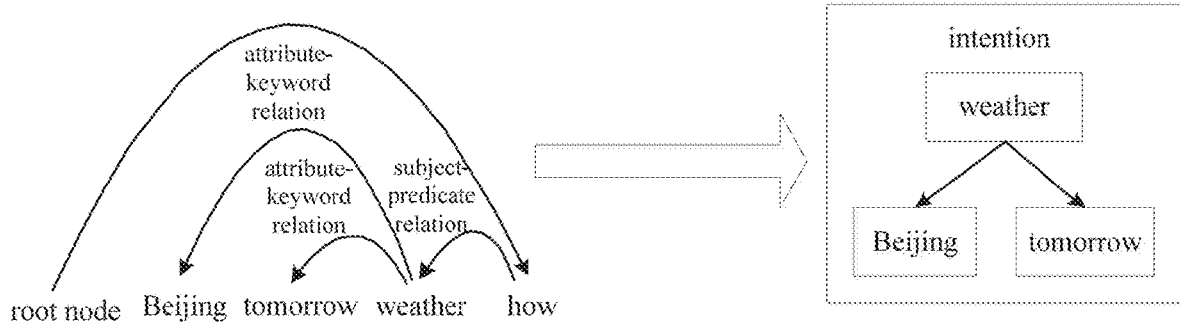
FIG. 3 is a schematic diagram illustrating acquiring a qualifier of the keyword based on a syntax tree.

FIG. 3 is a schematic diagram illustrating acquiring a qualifier of the keyword based on a syntax tree.

As shown in FIG. 3, it can be known according to the syntactic structure and the syntactic relation provided by the syntax tree that, a root node of the query "how about the weather in Beijing tomorrow?" is "how", a subject of the query is "weather". Thus, "weather" is the keyword of the intention of the query. Referring to FIG. 3, attributes of the keyword "weather" are "Beijing" and "tomorrow", therefore, qualifiers of the query are "Beijing" and "tomorrow".

In block S14, the intention of the query is determined according to the keyword and the qualifier.

In this embodiment, the intention of the query is determined according to the keyword and the qualifier after the keyword and the qualifier are acquired.

For example, the intention of the query may be acquired by combining the keyword "weather" with the qualifiers "time" and "place" modifying the keyword. For the query "how about the weather in Beijing tomorrow?", since the qualifiers are "Beijing" and "tomorrow", and the keyword is "weather", the intention of the query is "Beijing tomorrow weather".

For another example, the intention of the query may be acquired by combining the keyword "trains" with the qualifiers "time" and "place" modifying the keyword. For a query "how many trains from Beijing to Harbin at October $20^{th}$?", since the qualifiers are "October $20^{th}$", "Beijing", and "Harbin", and the keyword is "trains", the intention of the query is "October $20^{th}$ Beijing Harbin trains".

Figure 4:
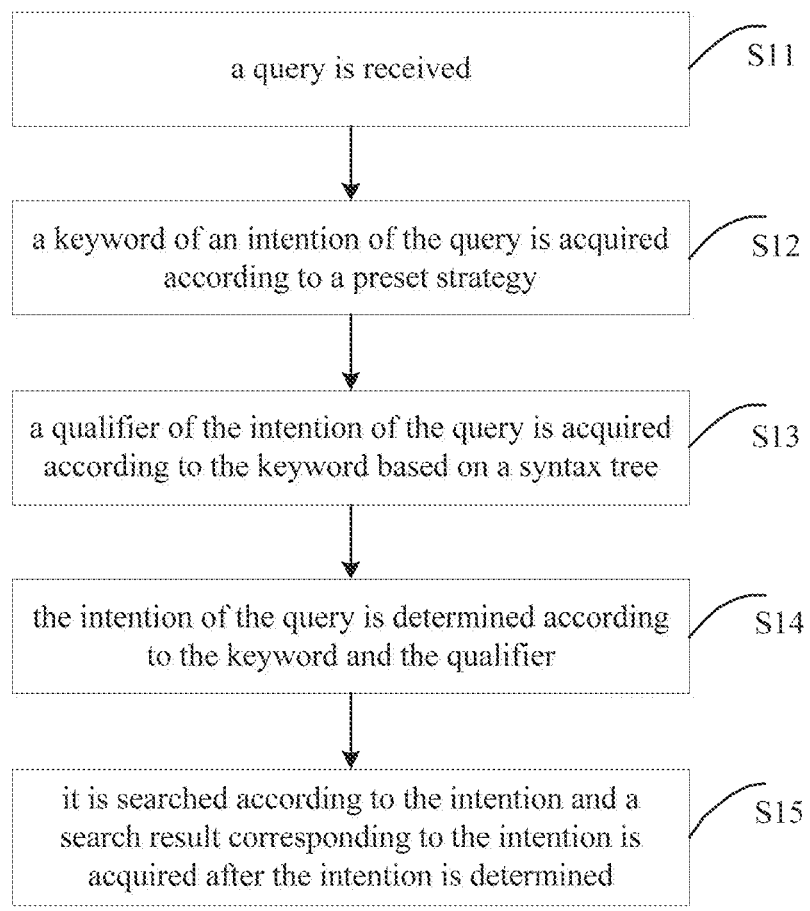
FIG. 4 is a flow chart of a method for analyzing an intention based on artificial intelligence according to another embodiment of the present disclosure.

Alternatively, as shown in FIG. 4, the method provided by embodiments of the present disclosure also includes following acts.

In block S15, it is searched according to the intention and a search result corresponding to the intention is acquired after the intention is determined.

In this embodiment, it is searched according to the intention after the intention is determined, and the search result corresponding to the intention is acquired, such that the searching result may be displayed to the user.

Figure 5:
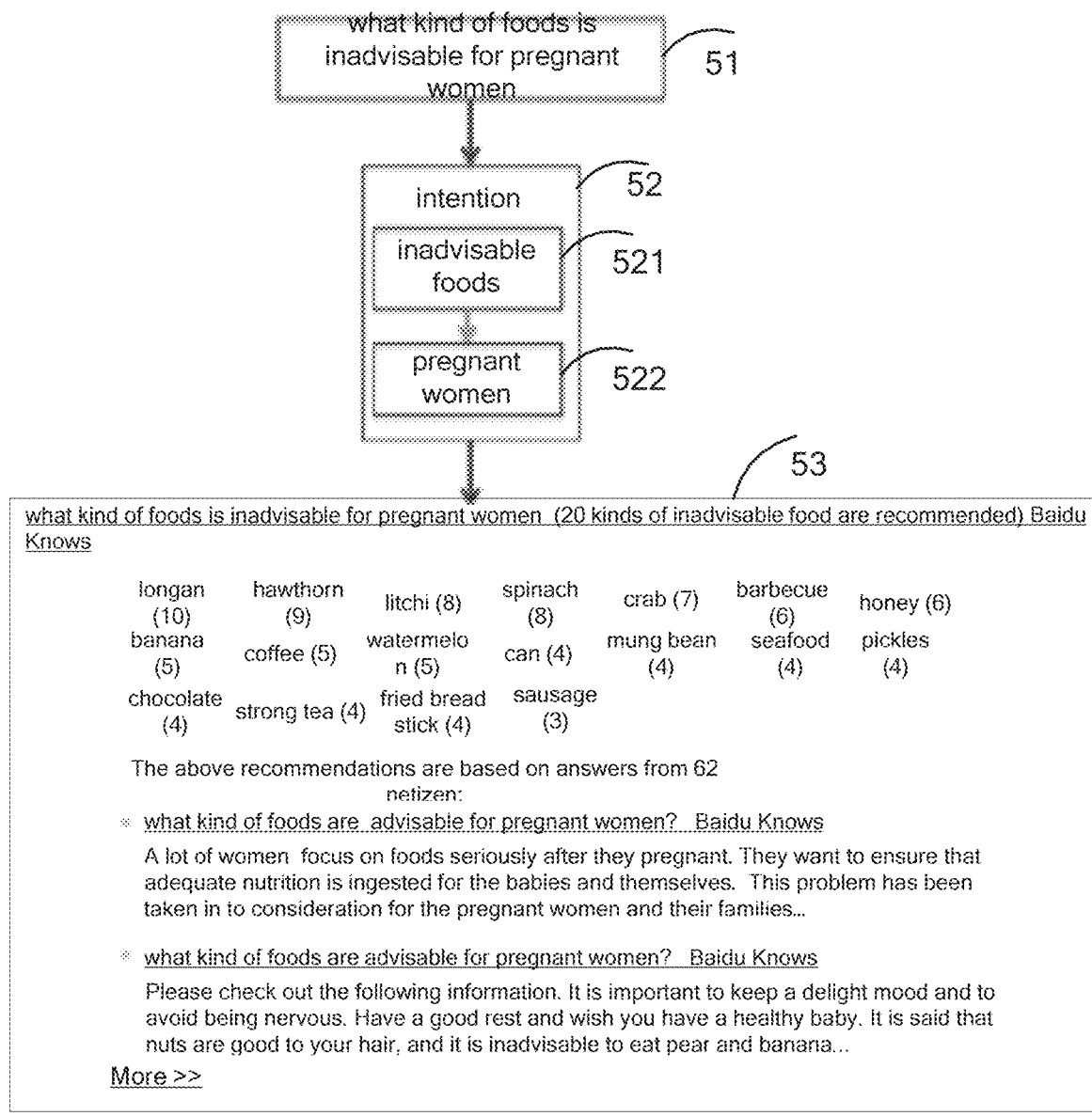
FIG. 5 is a schematic diagram illustrating applying the method for analyzing the intention based on artificial intelligence according to an embodiment of the present disclosure in a search engine to search information.

FIG. 5 is a schematic diagram illustrating applying the method for analyzing the intention based on artificial intelligence according to an embodiment of the present disclosure in a search engine to search information.

As shown in FIG. 5, when the user input a query "what kind of foods is inadvisable for pregnant women" 51 in the search engine, the search engine may analyze the intention of the query based on the method pre-mentioned, acquiring a keyword "inadvisable foods" 521 and a qualifier "pregnant women" 522. The intention 52 may be acquired by combining the keyword "inadvisable foods" 521 and the qualifier "pregnant women" 522. The search engine searches information according to the intention 52 and displays a search result 53 to the user. The user may know that there are 20 kinds of foods are inadvisable for pregnant women from the search result 53, and may search a source of each of the 20 kinds of foods.

It should be noted that, the method for analyzing the intention based on artificial intelligence according to embodiments of the present disclosure can be used in other internet applications (an intelligent question-answer system) as well as in the search engine, which is not limited in the present disclosure.

Figure 6:
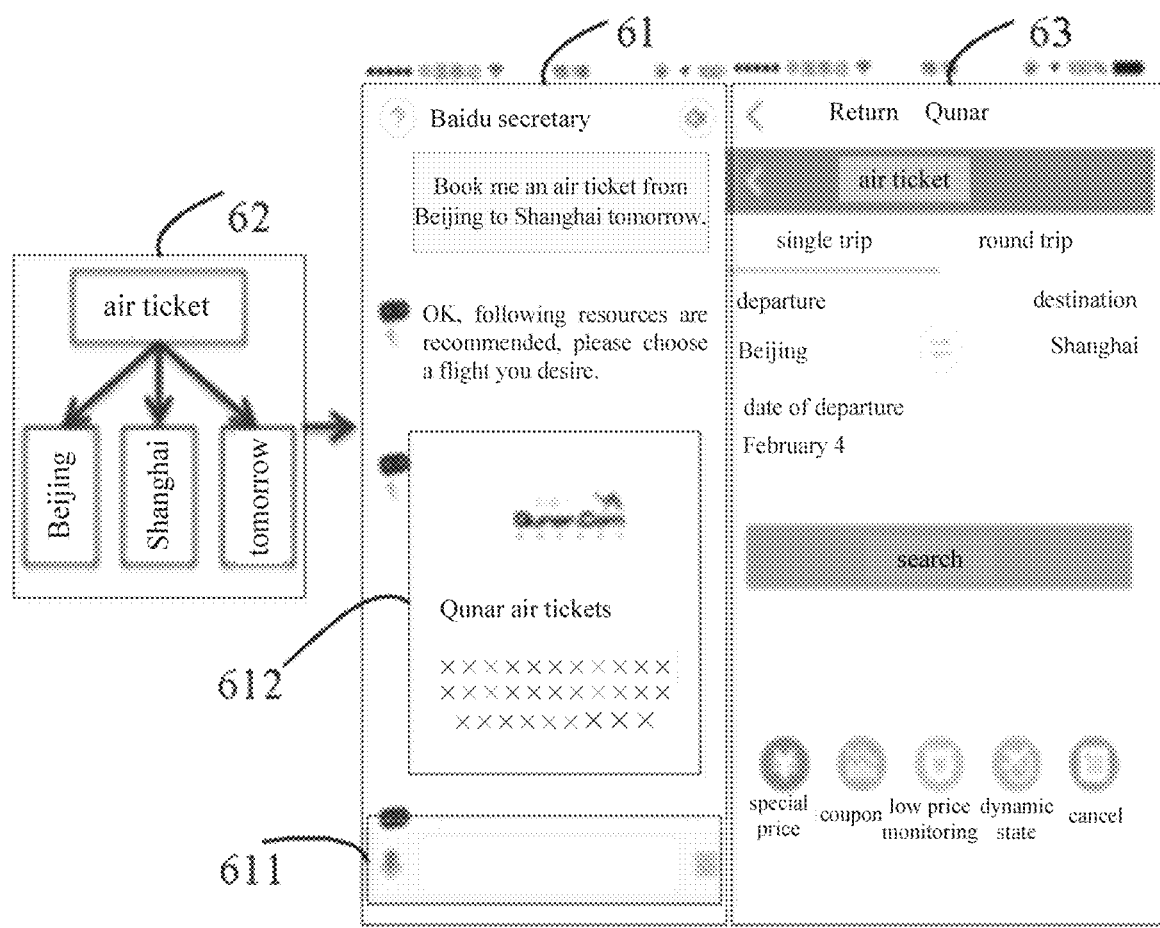
FIG. 6 is a schematic diagram illustrating applying the method for analyzing the intention based on artificial intelligence according to an embodiment of the present disclosure in an intelligent question-answer system.

FIG. 6 is a schematic diagram illustrating applying the method for analyzing the intention based on artificial intelligence according to an embodiment of the present disclosure in an intelligent question-answer system.

As shown in FIG. 6, when the user inputs a query "Book me an air ticket from Beijing to Shanghai tomorrow." in a dialog box 611 of the intelligent question-answer system in text or in speech and sends the query to a dialog list 61, the intelligent question-answer system receives the query and analyzes the query according to the method for analyzing an intention based on artificial intelligence so as to acquire an intention 62 corresponding to the query. The intention 62 includes a keyword "air ticket" and qualifiers "Beijing", "Shanghai" and "tomorrow". The intelligent question-answer system may search relative information according to the intention 62 after the intention 62 is acquired, and a smart robot in the intelligent question-answer system may return "OK, following resources are recommended, please choose a flight you desire." as an answer to the query, and the search result 612 may be displayed in the dialog list 61. When the user click the search result 612 in the dialog list 61, it may jump to a website or an application corresponding to the search result 612 for the user to select a service further. In this example, since the information relative to "Qunar air tickets" is displayed, it may jump to a display interface 63 of Qunar, displaying a departure "Beijing" and a destination "Shanghai" when the user clicks the search result 612. Information of flights from Beijing to Shanghai may be acquired after the user clicks a search button on the display interface 63 of Qunar.

The three ways for acquiring the keyword of the intention will be discussed in detail in following descriptions.

In a first way, the keyword of the intention of the query is acquired using the template strategy.

In the template strategy, the keyword of the intention may be acquired according to templates pre-generated, in which each of the templates is an abstract and simple representation generated by simplifying and generalizing a structure and elements of the query with a method in related art.

Figure 7:
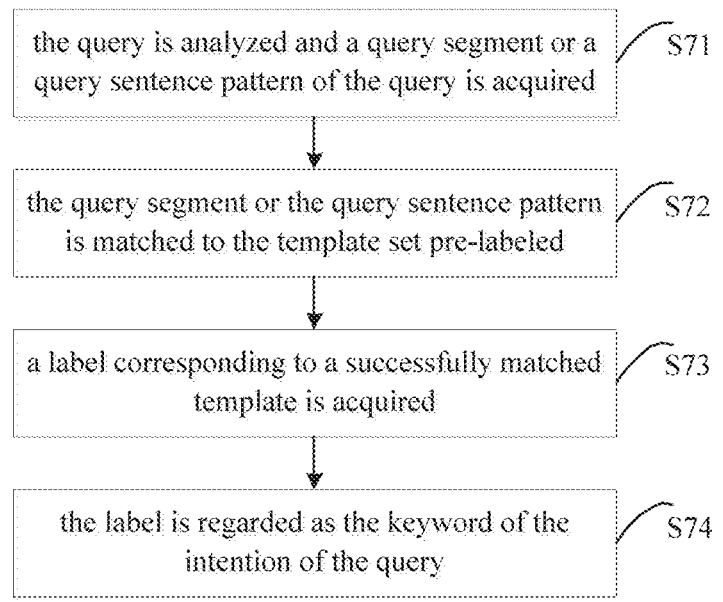
FIG. 7 is a flow chart showing acquiring a keyword of the intention of the query using a template strategy.

In an embodiment, as shown in FIG. 7, acquiring the keyword of the intention of the query using the template strategy may include following acts.

In block S71, the query is analyzed and a query segment or a query sentence pattern of the query is acquired.

In order to acquire the keyword of the intention by using the template strategy, mass training data may be collected and processed firstly so as to generate plentiful templates. After the templates are generated, templates that have a high frequency of occurrence and can uniquely identify an intention may be collected and be labeled manually.

It should be noted that there are various types of the templates, such as a query segment, a query sentence pattern or the like. The method for generating the template includes following acts.

Template 1 is the query segment.

Figure 8:
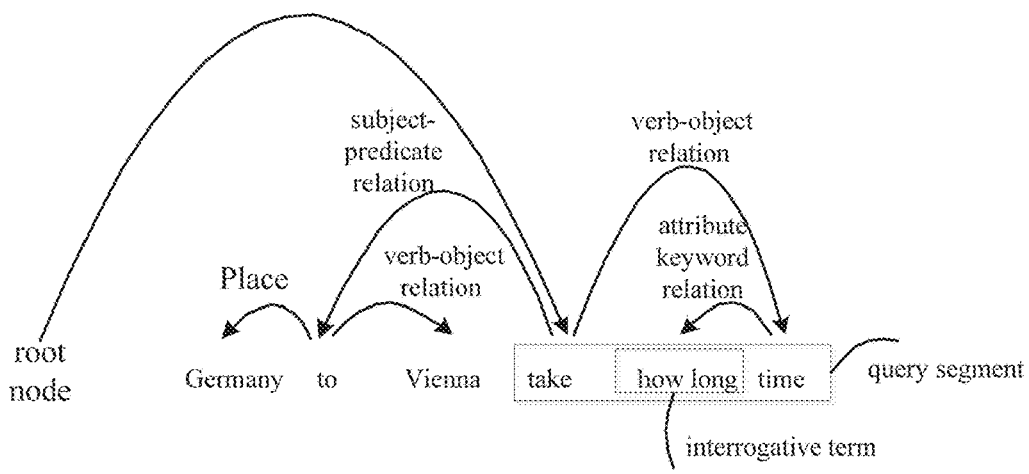
FIG. 8 is a schematic diagram of a syntax tree for acquiring a query segment of the query based on a dependency syntax parsing.

The query segment represents nodes included in a path from an interrogative term to a root node of the syntax tree. FIG. 8 is a schematic diagram of a syntax tree for acquiring a query segment of the query based on a dependency syntax parsing.

As shown in FIG. 8, an interrogative term of a query "how long does it take from Germany to Vienna" is "how long", a root node of the query independent from other nodes is "take". Referring to FIG. 8, there is no dependent relationship between the interrogative term and the root node, i.e., there is no path from the interrogative term "how long" to the root node "take" directly. However, the interrogative term "how long" is dependent on a node "time", and the node "time" is dependent on the root node "take", therefore, the node "time" can be used as a link between the interrogative term "how long" and the root node "take". In other words, the path from the interrogative term "how long" to the root node "take" includes three nodes (i.e., "how long", "take" and "time"). Therefore, the obtained query segment of the query "how long does it take from Germany to Vienna" is "how long does it take".

Template 2 is the query sentence pattern.

The query sentence pattern represents a sentence pattern generated by performing a type generalization on proper nouns and intention terms in the query according to an intention term list.

The intention term list configured to match the intention terms in the query may be preset before the query sentence pattern is acquired. A combination of one or more intention terms in the intention term list corresponds to one query sentence pattern. For example, the intention terms in the intention term list include "how many", "how long", "how", "time" and "kilometer" etc. When "how many" and "kilometer" are combined, a corresponding query sentence pattern is "How many kilometers from NS1 to NS2", in which "NS1" and "NS2" represent places. When the user inputs a query "how many kilometers from Zhengzhou to Xuzhou", the search engine may match the intention term of the query according to the intention term list, thus determining that the intention terms "how many" and "kilometer" in the intention term list are matched with the query. Thus, the query "how many kilometers from Zhengzhou to Xuzhou" may be generalized as "How many kilometers from NS1 to NS2" according to the query sentence pattern corresponding to a combination of "how many" and "kilometer".

After a template set is acquired, the query may be analyzed by using a same method for generating the template so as to acquire the query segment or the query sentence pattern of the query.

In block S72, the query segment or the query sentence pattern is matched to the template set pre-labeled.

In this embodiment, the query segment or the query sentence pattern may be matched to the template pre-labeled after the query segment or the query sentence pattern is acquired, such that a template matching the query segment or the query sentence pattern is acquired.

In block S73, a label corresponding to a successfully matched template is acquired.

In this embodiment, the successfully matched template to the query segment or the query sentence pattern is acquired when the query segment or the query sentence pattern is matched to the template pre-labeled, and then the label corresponding to the successfully matched template is obtained. If the template is the interrogative sentence, the method will be described as follows.

It is assumed that there are several intention terms such as "how many", "how long", "how", "kilometer", "how far" etc. in the intention term list. Both a query sentence pattern corresponding to an intention term "how far" and a query sentence pattern corresponding to a combination of intention terms "how many" and "kilometer" are "how many kilometers from NS1 to NS2", in which "NS1" and "NS2" represent places. The query sentence pattern "how many kilometers from NS1 to NS2" is manually labeled as "distance query". When the user inputs a query "how far from Beijing to Qingdao", the search engine may firstly match the intention term of the query according to the intention term list, and determine that an intention term "how far" in the intention term list matches the query. Thus, the query sentence pattern "how many kilometers from NS1 to NS2" may be acquired according to the intention term "how far", and the label "distance query" may be acquired according to the query sentence pattern.

In block S74, the label is regarded as the keyword of the intention of the query.

In this embodiment, since the template corresponding to the label can successfully match the query segment or the query sentence pattern, the label is able to indicate the intention of the query after the label is acquired, i.e., the label corresponding to the template can be regarded as the keyword of the query.

In the second way, the keyword of the intention of the query may be acquired using the rule strategy.

The rule strategy refers to a method in which the intention of the query is determined according to a set of certain conditions. A judgment rule used in the rule strategy includes two parts: a syntactic structure and a knowledge base, which are summarized manually by analyzing a massive of data.

Figure 9:
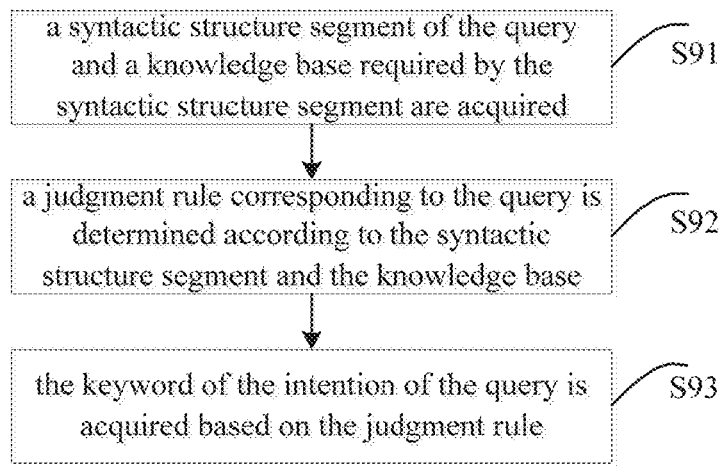
FIG. 9 is a flow chart showing acquiring a keyword of the intention of the query using a rule strategy.

In an embodiment, as shown in FIG. 9, acquiring the keyword of the intention of the query according to the rule strategy may include following acts.

In block S91, a syntactic structure segment of the query and a knowledge base required by the syntactic structure segment are acquired.

In this embodiment, the search engine may perform a syntactic analysis on the query using related technology after the query is input by the user, such that the syntactic structure segment of the query is acquired. At the same time, the knowledge base related to the query is acquired.

In block S92, a judgment rule corresponding to the query is determined according to the syntactic structure segment and the knowledge base.

In this embodiment, the judgment rule corresponding to the query may be determined according to the syntactic structure segment and the knowledge base after the syntactic structure segment and the knowledge base are acquired.

For example, when the user inputs a query "how to say 你好 in English", the syntactic structure segment of the query is "how to say in English" by analyzing the query with the related technology. Since a language type "English" is included in the query, a knowledge base "language type" related to the query may be acquired, in which various languages such as English, Germany and Korean etc. are included in the knowledge base "language type". And then, a judgment rule "how to say in XX" corresponding to the query may be determined according to the syntactic structure segment "how to say in English" and the knowledge base "language type", in which "XX" represents one language in the knowledge base "language type".

In block S93, the keyword of the intention of the query is acquired based on the judgment rule.

In this embodiment, the keyword of the intention of the query is acquired based on the judgment rule after the judgment rule corresponding to the query is determined.

For example, when the user inputs the query "how to say 你好 in English", the syntactic structure segment of the query is "how to say in English" by analyzing the query with the related technology. Since a language type "English" is included in the query, the knowledge base "language type" related to the query may be acquired, in which various languages such as English, Germany and Korean etc. are included in the knowledge base. And then, the judgment rule "how to say in XX" corresponding to the query may be determined according to the syntactic structure segment "how to say in English" and the knowledge base "language type", in which "XX" represents one language in the knowledge base "language type". The keyword of the intention of the query is determined as "translation" based on the judgment rule after the judgment rule corresponding to the query is determined.

In the third way, the keyword of the intention may be acquired using the model strategy.

Figure 10:
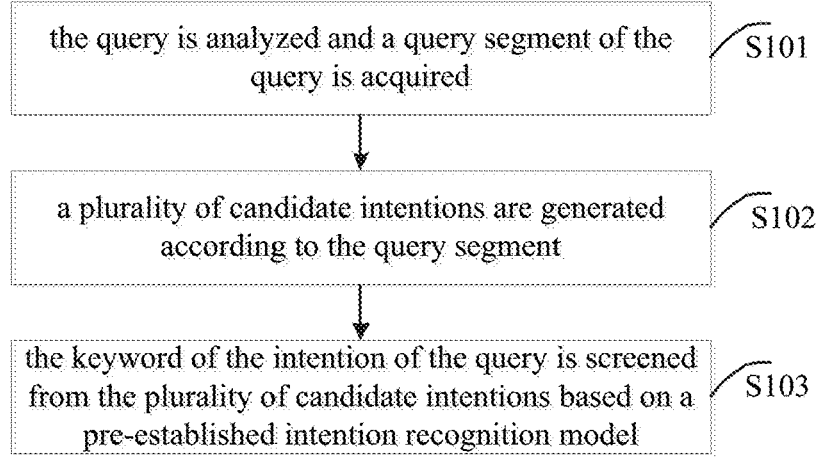
FIG. 10 is a flow chart showing acquiring a keyword of the intention of the query using a model strategy.

Specifically, as shown in FIG. 10, acquiring the keyword of the intention using the model strategy may include following acts.

In block S101, the query is analyzed and a query segment of the query is acquired.

In this embodiment, the query is analyzed so as to acquire the query segment of the query after the search engine receives the query input by the user.

It should be noted that the query segment of the query may be acquired by using the dependency syntax parsing pre-mentioned or by other methods, which is not limited in the present disclosure.

In block S102, a plurality of candidate intentions are generated according to the query segment.

In this embodiment, the plurality of candidate intentions are generated according to the query segment after the query segment is acquired.

In block S103, the keyword of the intention of the query is screened from the plurality of candidate intentions based on a pre-established intention recognition model.

In this embodiment, in order to screen out the keyword of the intention of the query from the plurality of candidate intentions, the intention recognition model may be generated using massive intention training data, in which the intention training data may be generated according to the template strategy and the rule strategy pre-mentioned. Therefore, the keyword of the intention of the query can be screened from the plurality of candidate intentions based on the intention recognition model established.

It should be noted that the keyword of the intention of the query may be screened from the plurality of candidate intentions by means of scoring. Specifically, the plurality of candidate intentions may be scored based on the intention recognition model established, and one of the plurality of candidate intentions with a highest score may be regarded as the keyword of the intention of the query. Other methods for screening the keyword of the intention of the query from the plurality of candidate intentions may be used, which is not limited in the present disclosure.

With the method for analyzing an intention based on artificial intelligence according to embodiments of the present disclosure, the keyword of the intention of the query may be acquired according to the preset strategy, the qualifier of the intention of the query may be acquired according to the keyword based on the syntax tree, and the intention of the query may be determined according to the keyword and the qualifier. Therefore, analysis on an intention of a query in various fields may be realized, a limitation in a field of intention analysis may be eliminated, thus enlarging a range of intention analysis and improving an efficiency of intention analysis.

Figure 11:
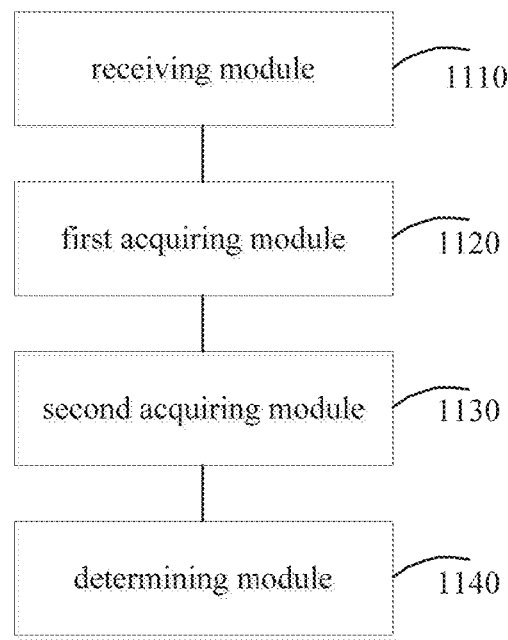
FIG. 11 is a structure diagram of an apparatus for analyzing an intention based on artificial intelligence according to an embodiment of the present disclosure.

In order to realize the above embodiments, an apparatus for analyzing an intention based on artificial intelligence is provided in the present disclosure. FIG. 11 is a structure diagram of an apparatus for analyzing an intention based on artificial intelligence according to an embodiment of the present disclosure.

As shown in FIG. 11, the apparatus for analyzing the intention based on artificial intelligence according to this embodiment includes a receiving module 1110, a first acquiring module 1120, a second acquiring module 1130, and a determining module 1140.

The receiving module 1110 is configured to receive a query.

The first acquiring module 1120 is configured to acquire a keyword of an intention of the query according to a preset strategy.

In an embodiment, the first acquiring module 1120 is configured to acquire the keyword of the intention of the query according to a template strategy, or to acquire the keyword of the intention of the query according to a rule strategy, or to acquire the keyword of the intention of the query according to a model strategy.

Alternatively, when the first acquiring module 1120 acquires the keyword of the intention of the query according to the template strategy, the first acquiring module 1120 is configured to analyze the query and to acquire a query segment or a query sentence pattern of the query, to match the query segment or the query sentence pattern to a template pre-labeled, and to acquire a label corresponding to a successfully matched template, in which the label is regarded as the keyword of the intention of the query.

When the first acquiring module 1120 acquires the keyword of the intention of the query according to the rule strategy, the first acquiring module 1120 is configured to acquire a syntactic structure segment of the query and a knowledge base required by the syntactic structure segment, to determine a judgment rule corresponding to the query according to the syntactic structure segment and the knowledge base, and to acquire the keyword of the intention of the query based on the judgment rule.

When the first acquiring module 1120 acquires the keyword of the intention of the query according to the model strategy, the first acquiring module 1120 is configured to analyze the query and to acquire a query segment of the query, to generate a plurality of candidate intentions according to the query segment, and to screen the keyword of the intention of the query from the plurality of candidate intentions based on a pre-established intention recognition model.

The second acquiring module 1130 is configured to acquire a qualifier of the intention of the query according to the keyword based on a syntax tree.

The determining module 1140 is configured to determine the intention of the query according to the keyword and the qualifier.

Figure 12:
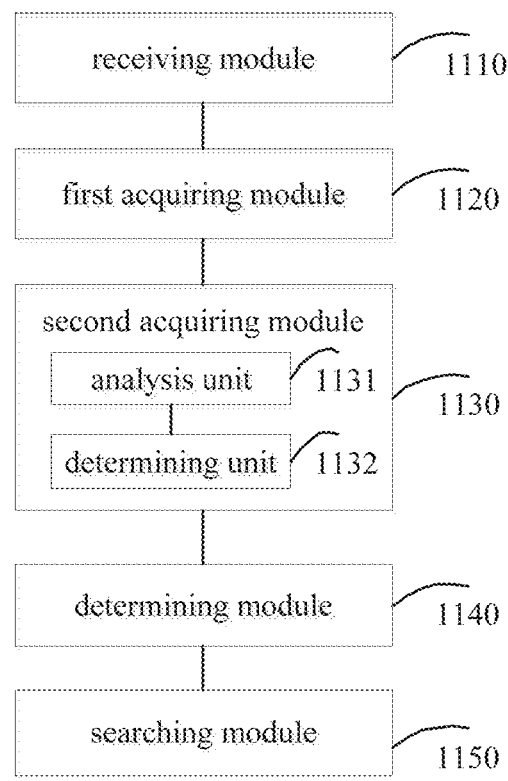
FIG. 12 is a structure diagram of an apparatus for analyzing an intention based on artificial intelligence according to another embodiment of the present disclosure.

FIG. 12 is a structure diagram of an apparatus for analyzing an intention based on artificial intelligence according to another embodiment of the present disclosure.

Alternatively, in some embodiments, as shown in FIG. 12, the apparatus also includes a searching module 1150, in which the searching module 1150 is configured to search according to the intention and to acquire a search result corresponding to the intention after the intention is determined.

The second acquiring module 1130 includes an analysis unit 1131 and a determining unit 1132.

The analysis unit 1131 is configured to acquire a syntactic structure and a syntactic relation based on the syntax tree.

The determining unit 1132 is configured to determine the qualifier of the intention of the query according to the syntactic structure and the syntactic relation.

It should be noted that descriptions of the method for analyzing the intention based on artificial intelligence are also suitable for the apparatus for analyzing the intention based on artificial intelligence, with similar implementation principle, which is not described herein.

With the apparatus for analyzing an intention based on artificial intelligence according to embodiments of the present disclosure, the keyword of the intention of the query may be acquired according to the preset strategy, the qualifier of the intention of the query may be acquired according to the keyword based on the syntax tree, and the intention of the query may be determined according to the keyword and the qualifier. Therefore, analysis on an intention of a query in various fields may be realized, a limitation in a field of intention analysis may be eliminated, thus enlarging a range of intention analysis and improving an efficiency of intention analysis.

In order to achieve the above embodiments, the present disclosure also provides a terminal, including: a processor; a memory for storing instructions executed by the processor, in which the processor is configured to perform following acts.

In block S11', a query is received.

In block S12', a keyword of an intention of the query is acquired according to a preset strategy.

In block S13', a qualifier of the intention of the query is acquired according to the keyword based on a syntax tree.

In block S14', the intention of the query is determined according to the keyword and the qualifier.

It should be noted that descriptions of the method for analyzing the intention based on artificial intelligence are also suitable for the terminal, with similar implementation principle, which is not described herein.

With the terminal according to embodiments of the present disclosure, the keyword of the intention of the query may be acquired according to the preset strategy, the qualifier of the intention of the query may be acquired according to the keyword based on the syntax tree, and the intention of the query may be determined according to the keyword and the qualifier. Therefore, analysis on an intention of a query in various fields may be realized, a limitation in a field of intention analysis may be eliminated, thus enlarging a range of intention analysis and improving an efficiency of intention analysis.

In order to achieve the above embodiments, the present disclosure also provides a non-transitory computer readable storage medium for storing one or more application programs, when executed by one or more processors in a mobile terminal, causing the mobile terminal to execute the method for analyzing the intention based on artificial intelligence according to the embodiments of the first aspect of the present disclosure.

With the non-transitory computer readable storage medium according to embodiments of the present disclosure, the keyword of the intention of the query may be acquired according to the preset strategy, the qualifier of the intention of the query may be acquired according to the keyword based on the syntax tree, and the intention of the query may be determined according to the keyword and the qualifier. Therefore, analysis on an intention of a query in various fields may be realized, a limitation in a field of intention analysis may be eliminated, thus enlarging a range of intention analysis and improving an efficiency of intention analysis.

In order to achieve the above embodiments, the present disclosure also provides a computer program product, when instructions in the computer program product are executed by a processor, executing the method for analyzing the intention based on artificial intelligence according to the embodiments of the first aspect of the present disclosure.

With the computer program product according to embodiments of the present disclosure, the keyword of the intention of the query may be acquired according to the preset strategy, the qualifier of the intention of the query may be acquired according to the keyword based on the syntax tree, and the intention of the query may be determined according to the keyword and the qualifier. Therefore, analysis on an intention of a query in any field may be realized, a limitation in a field of intention analysis may be eliminated, thus enlarging a range of intention analysis and improving an efficiency of intention analysis.

It should be noted that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

The flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function modules and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for analyzing an intention of a user of a terminal comprising a processor and memory based on artificial intelligence, comprising:
   receiving a query from the user of the terminal;
   acquiring a keyword of an intention of the query according to a preset strategy;
   acquiring a qualifier of the intention of the query according to the keyword based on a syntax tree; and
   determining the intention of the query according to the keyword and the qualifier,
   wherein acquiring the keyword of the intention of the query according to a preset strategy comprises:
   acquiring the keyword of the intention of the query according to a template strategy,
   wherein, acquiring the keyword of the intention of the query according to the template strategy comprises:
   analyzing the query and acquiring an interrogative segment or an interrogative sentence pattern of the query;
   matching the interrogative segment or the interrogative sentence pattern to a pre-labeled template set; and
   acquiring a label corresponding to a successfully matched template, wherein the label is regarded as the keyword of the intention of the query,
   wherein the interrogative segment represents nodes included in a path from an interrogative term to a root node of the syntax tree, and the interrogative sentence pattern represents a sentence pattern generated by performing a type generalization on proper nouns and intention terms in an interrogative sentence according to an intention term list.

2. The method according to claim 1, wherein acquiring the keyword of the intention of the query according to a preset strategy further comprises:
acquiring the keyword of the intention of the query according to a rule strategy; or
acquiring the keyword of the intention of the query according to a model strategy.

3. The method according to claim 2, wherein acquiring the keyword of the intention of the query according to a model strategy comprises:
analyzing the query and acquiring a query segment of the query;
generating a plurality of candidate intentions according to the query segment; and
screening the keyword of the intention of the query from the plurality of candidate intentions based on a pre-established intention recognition model.

4. The method according to claim 2, wherein acquiring the keyword of the intention of the query according to the rule strategy comprises:
acquiring a syntactic structure segment of the query and a knowledge base required by the syntactic structure segment;
determining a judgment rule corresponding to the query according to the syntactic structure segment and the knowledge base, wherein the judgment rule corresponding to the query is configured to acquire the key word of the intention of the query; and
acquiring the keyword of the intention of the query based on the judgment rule.

5. The method according to claim 1, wherein acquiring a qualifier of the intention of the query according to the keyword based on a syntax tree comprises:
acquiring a syntactic structure and a syntactic relation based on the syntax tree; and
determining the qualifier of the intention of the query according to the syntactic structure and the syntactic relation.

6. The method according to claim 1, further comprising:
searching according to the intention and acquiring a search result corresponding to the intention after the intention is determined.

7. An apparatus for analyzing an intention based on artificial intelligence, comprising:
one or more processors, and
a memory having instructions executable by the processor stored thereon, wherein the one or more processors are configured to perform acts of:
receiving a query from a user of the apparatus;
acquiring a keyword of an intention of the query according to a preset strategy;
acquiring a qualifier of the intention of the query according to the keyword based on a syntax tree; and
determining the intention of the query according to the keyword and the qualifier,
wherein acquiring the keyword of the intention of the query according to a preset strategy comprises:
acquiring the keyword of the intention of the query according to a template strategy,
wherein acquiring the keyword of the intention of the query according to the template strategy comprises:
analyzing the query and acquiring an interrogative segment or an interrogative sentence pattern of the query;
matching the interrogative segment or the interrogative sentence pattern to a pre-labeled template set; and
acquiring a label corresponding to a successfully matched template, wherein the label is regarded as the keyword of the intention of the query,
wherein the interrogative segment represents nodes included in a path from an interrogative term to a root node of the syntax tree, and the interrogative sentence pattern represents a sentence pattern generated by performing a type generalization on proper nouns and intention terms in an interrogative sentence according to an intention term list.

8. The apparatus according to claim 7, wherein acquiring the keyword of the intention of the query according to a preset strategy comprises
acquiring the keyword of the intention of the query according to a rule strategy; or
acquiring the keyword of the intention of the query according to a model strategy.

9. The apparatus according to claim 8, wherein acquiring the keyword of the intention of the query according to a model strategy comprises:
analyzing the query and acquire a query segment of the query;
generating a plurality of candidate intentions according to the query segment; and
screening the keyword of the intention of the query from the plurality of candidate intentions based on a pre-established intention recognition model.

10. The apparatus according to claim 8, wherein acquiring the keyword of the intention of the query according to the rule strategy comprises:
acquiring a syntactic structure segment of the query and a knowledge base required by the syntactic structure segment;
determining a judgment rule corresponding to the query according to the syntactic structure segment and the knowledge base, wherein the judgment rule corresponding to the query is configured to acquire the key word of the intention of the query; and
acquiring the keyword of the intention of the query based on the judgment rule.

11. The apparatus according to claim 7, wherein acquiring a qualifier of the intention of the query according to the keyword based on a syntax tree comprises:
acquiring a syntactic structure and a syntactic relation based on the syntax tree; and
determining the qualifier of the intention of the query according to the syntactic structure and the syntactic relation.

12. The apparatus according to claim 7, wherein the one or more processors further configured to perform:
searching according to the intention and to acquire a search result corresponding to the intention after the intention is determined.

13. A non-transitory computer readable storage medium comprising instructions, wherein when the instructions are executed by a processor of a device to perform acts of:
receiving a query from a user of the device;
acquiring a keyword of an intention of the query according to a preset strategy;
acquiring a qualifier of the intention of the query according to the keyword based on a syntax tree; and
determining the intention of the query according to the keyword and the qualifier,
wherein acquiring the keyword of the intention of the query according to a preset strategy comprises:

acquiring the keyword of the intention of the query according to a template strategy, wherein acquiring the keyword of the intention of the query according to the template strategy comprises:

analyzing the query and acquiring an interrogative segment or an interrogative sentence pattern of the query;

matching the interrogative segment or the interrogative sentence pattern to a pre-labeled template set; and acquiring a label corresponding to a successfully matched template, wherein the label is regarded as the keyword of the intention of the query, wherein the interrogative segment represents nodes included in a path from an interrogative term to a root node of the syntax tree, and the interrogative sentence pattern represents a sentence pattern generated by performing a type generalization on proper nouns and intention terms in an interrogative sentence according to an intention term list.

14. The non-transitory computer readable storage medium according to claim 13, wherein acquiring the keyword of the intention of the query according to a preset strategy comprises:

acquiring the keyword of the intention of the query according to a rule strategy; or acquiring the keyword of the intention of the query according to a model strategy.

15. The non-transitory computer readable storage medium according to claim 14, wherein acquiring the keyword of the intention of the query according to a model strategy comprises:

analyzing the query and acquiring a query segment of the query;

generating a plurality of candidate intentions according to the query segment; and screening the keyword of the intention of the query from the plurality of candidate intentions based on a pre-established intention recognition model.

16. The non-transitory computer readable storage medium according to claim 14, wherein acquiring the keyword of the intention of the query according to the rule strategy comprises:

acquiring a syntactic structure segment of the query and a knowledge base required by the syntactic structure segment;

determining a judgment rule corresponding to the query according to the syntactic structure segment and the knowledge base, wherein the judgment rule corresponding to the query is configured to acquire the key word of the intention of the query; and acquiring the keyword of the intention of the query based on the judgment rule.

17. The non-transitory computer readable storage medium according to claim 13, wherein acquiring a qualifier of the intention of the query according to the keyword based on a syntax tree comprises:

acquiring a syntactic structure and a syntactic relation based on the syntax tree; and determining the qualifier of the intention of the query according to the syntactic structure and the syntactic relation.

* * * * *